Jan. 26, 1971 H. H. FAUST ET AL 3,557,453
DENTAL APPLIANCE AND METHODS OF USING THE SAME
Filed April 10, 1968 3 Sheets-Sheet 1

INVENTORS
HENRY H. FAUST
PETER J. FAUST
BY
ATTORNEY

Jan. 26, 1971  H. H. FAUST ET AL  3,557,453
DENTAL APPLIANCE AND METHODS OF USING THE SAME
Filed April 10, 1968  3 Sheets-Sheet 2

INVENTORS
HENRY H. FAUST
PETER J. FAUST
BY
ATTORNEY

United States Patent Office 3,557,453
Patented Jan. 26, 1971

3,557,453
DENTAL APPLIANCE AND METHODS OF USING THE SAME
Henry H. Faust, 319 E. 1st St., and Peter J. Faust, 308 E. Dobbs St., both of Tyler, Tex. 75701
Filed Apr. 10, 1968, Ser. No. 720,076
Int. Cl. A61c *13/00*
U.S. Cl. 32—2
23 Claims

ABSTRACT OF THE DISCLOSURE

Dental appliances and methods of using the same, and particularly methods and apparatus for making full denture constructions providing an accurate and natural functional plane of occlusion and positive centric relationship or position for use in the full dental construction by utilization of the patient's own masticatory movement. The method and apparatus is also adapted for use in determining, and setting teeth to, a proper functional natural path of occlusion in partial dentures involving full posterior tooth replacement.

---

This invention relates to dental appliances and to the methods of using the same, and more particularly to the construction of full dentures or full posterior partial denture replacements.

With the loss of natural teeth necessitating the installation of dentures, the proper determination of the horizontal plane or path of occlusion and the positive centric point or position of the patient's masticatory mechanism is most desirable to prevent discomfort, undesirable modification of the musculature and esthetic appearance of the patient and the obtaining of most chewing efficiency with the least exertion possible to avoid rapid tiring during masticatory use of the dentures. In the past, it has been common that, when full dentures are made, all muscles involved must adapt to the new path of occlusion to which the posterior teeth are set in the dentures. This often results in considerable discomfort, pain, muscular change and a change in the facial appearance of the patient, as a result of the necessity for the muscles to adapt to and accommodate to a new path or plane of occlusion, which has been provided arbitrarily in the manufacture or construction of the dentures.

It is, therefore, one object of the invention to provide improved methods and apparatus for the construction of dentures which utilize the patient's own muscular and structural complex to determine, prior to the manufacture of the dentures, the correct centric relationship and a natural and most comfortable occlusal plane or path of occlusion adjusted to the natural muscular and structural configuration of the patient.

It is the further object of the invention to provide a method and apparatus for determining a most comfortable, normal, natural plane of occlusion which harmonizes with the patient's chewing mechanism, by means of apparatus and the use of a technique utilizing the patient's own chewing mechanism.

Still another object of the invention is to provide an improved apparatus for determining the centric relation of the patient's mandible and maxilla for most comfortable chewing.

A further important object of the invention is to provide an improved method of forming mnemonic patterns or plates within the patient's mouth for accurate location of the most comfortable and natural path of occlusion for movement of the dentures by the patient.

Still another object is to provide an appliance which is usable in the patient's mouth to record a pattern of the occlusal plane of the patient conforming to the patient's own natural chewing operation, and producing the most comfortable results.

Still another object of the invention is to provide dental appliances and a method of using same which are adapted for use in the mouth of the patient and dispense with the need for extensive and costly mechanisms, such as complicated anatomical articulators which require complex and extensive measurements of the exterior and interior of the patient's mouth and the adjustment of the articulator to obtain an arbitrary horizontal plane of occlusion which would only be somewhat harmonious with the patient's chewing mechanism.

A further particular object of the invention is to provide a means and method for obtaining a record or pattern or platen indicative of the patient's natural, normal, comfortable plane of occlusion to which the teeth in the denture may be set to secure such an accurate comfortable occlusion.

A particularly important object of the invention is to provide a mnemonic carver and a mnemonic platen which co-act to produce a record or pattern of the patient's normal, comfortable natural plane of occlusion to which to set the teeth of the denture.

A further important object of the invention is to provide means for recording the gothic arch tracing of the movements of the patient's mandible with respect to the maxilla to determine the normal centric position of the patient's chewing mechanism, and wherein of the means for providing such tracing, the recording plate is carried on the maxilla model base plate and the tracing pin is carried on the mandible model base plate to provide room for the patient's tongue and greater comfort in the use of the apparatus, and to reduce the possibility of dislodgement or shifting of the models by the tongue during the making of the tracing.

A still further object of the invention is to provide mnemonic carvers and mnemonic platens having a composition readily carvable by the carvers to record the plane of occlusion, and which are adapted to be incorporated in and mounted on wax-up models formed on plastic base plates adapted to the patient's oral models.

A still further object of the invention is to provide mnemonic carvers of the character described adapted for use under various conditions of movement of the patient's muscular and structural configuration to provide an accurate carving, tracing, pattern or record of the patient's normal plane of occlusion.

Additional objects and advantages of the invention will be readily apparent from the reading of the following description of apparatus constructed in accordance with the invention and of the methods of utilizing the same, in reference to the accompanying drawings, wherein:

Preliminary to carrying out the practice of the methods or technique of construction of the denture having a plane of occlusion determined from the actual manipulation of the chewing mechanism of the patient, an impression of the patient's upper or maxillary configuration or structure is made in the usual manner, and, similarly, an impression of the lower or mandibular structure is made, also in the usual manner. From these impressions, upper and lower stone master models 10 and 11, respectively, are cast. Then a plastic base plate is made by vacuum or other suitable process of each of the stone models separately to provide an upper base plate 12 and a lower base plate 13, respectively. On the ridges or alveolar processes of the base plates, a wax bite rim 14 and 15, respectively, is formed to provide models of the bite relationship of each of the upper and lower structures of the patient. These bite rims (or bite blocks) are then placed in the patient's mouth and the wax rims are compressed or deformed by the patient closing the mandible toward the maxilla. The central or median line of the patient's mouth is recorded by marking the same on the wax bite rims as at 16, and similarly the relaxed position of the upper lip, or the upper lip line 17, is marked or carved on the upper wax anterior portion of the upper wax bite rim. Also, other measurements of the patient's mouth may be indicated on the bite rims in the usual manner. In addition, the dentist may also contour or shape the labial portions of the wax rims as at 18 to a form to produce the desired esthetic configuration to the patient's mouth while the bite rim models are in place for fitting. The temporary bite rim models are then luted or temporarily locked together as at 14 to position the upper and lower models in proper vertical spacial relationship and in a wax bite centric relationship with respect to each other. To this point the method outlined is one usually followed in constructing dentures.

Figure 1:
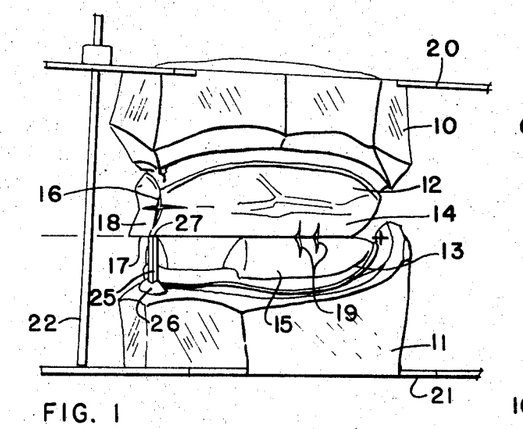
FIG. 1 is an elevational view taken at an angle from the median line of the wax bite rim models or bite blocks which have been contoured or shaped by the dentist in the patient's mouth and luted together, showing the same mounted on the arms of an articulator and a stop or spacer member positioned on the lower stone model with its upper end disposed at the intersection of the median and upper lip line.

The thus luted or temporarily locked models of the upper and lower denture base plates with the wax bite rims thereon are then mounted on the arms 20 and 21 of an articulator, as shown in FIG. 1, by means of plaster or other suitable material on bases or platforms permitting the stone master models to be removably affixed to the upper and lower arms of the articulator, which may be of any desired type commonly in use. The front pin 22 of the articulator is set to a flat plane, which is later used for spot grinding of the upper posterior teeth of the denture after the acrylic or other permanent denture bases have been completed to eliminate processing changes caused by the inherent characteristics of the plastic base plate materials used.

Figure 2:
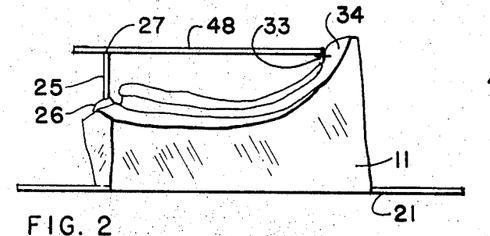
FIG. 2 is a side view of the lower stone model showing the stop or spacer member fixed to the anterior portion of the model and having its upper end supporting a triangular flat or planar template thereon at the points of the retro-molar pads and on the upper end of the stop.
Figure 3:
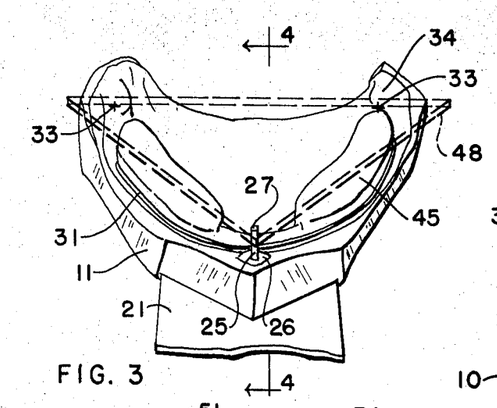
FIG. 3 is a view from above, in perspective, of the lower stone model showing the triangular planar template supported at the three points provided at the retro-molar pads and the upper end of the stop.

A stop or spacer member 25 is then affixed by wax or compound 26 or the like to the lower stone model 11 and so positioned that its upper end 27 is at the upper low lip line 17 and at the intersection of the upper lip line and the median line 16 of the wax rims, as marked by the dentist. The wax bite rims are then removed from the stone master models and a second set of upper and lower acrylic or other suitable plastic "chew-in" base plates 30 and 31, respectively, are vacuum formed or otherwise suitably formed or adapted to the master model and trimmed to the proper size along the margins thereof, and chew-in models are constructed on these base plates.

At this point, a line (not shown) is drawn along the alveolar process or ridge 32 from a selected anterior point 33 of the retromolar pad 34 to the point of the cuspid area on each side of the lower master model 11. A second line interiorly of the first is also drawn along the ridge on each side of the lower model. The first drawn line will generally follow the central line or ridge of the alveolar process of the patient.

Mnemonic carver members 35 (FIG. 17) formed of metal, preferably stainless steel or other suitable hard material, have a planar rectangular base portion 36 which is preferably provided with apertures or recesses 37 to receive sticky wax or compound to hold the carvers securely to the chew-in base plate, here the lower chew-in plate 31. A central longitudinal, or middle, main carver blade 38 is formed extending throughout the length of the carver member and laterally spaced auxiliary or relief cutters 34 are formed to each side of and parallel to the middle or main carver blade. The relief cutter blades are lower in height above the base portion than the main carver blade and serve to clear lateral portions of a trench in the chew-in model carved by the middle or main carver blade. The carver member may be formed by dies, milling or otherwise suitably shaping elongate metal strips or bars into the desired configuration, and then cutting the same to the desired lengths. Obviously, the length of the carver may vary in different mouths, since the length of the posterior alveolar ridge of each patient will differ from that of other patients, and it is desired that the blades be of the length corresponding at least to the extent of the posterior teeth to be used in the denture.

Figures 17, 18, 22:
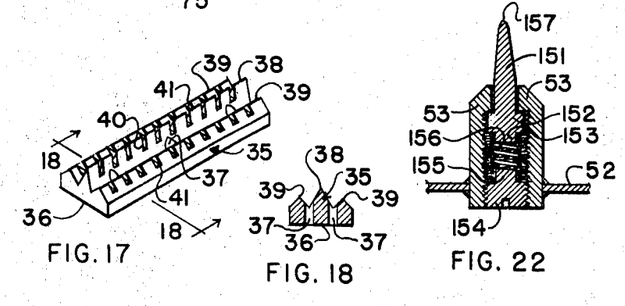
FIG. 17 is a perspective view from above of one of the mnemonic carvers.
FIG. 18 is a transverse vertical sectional view taken on the line 18—18 of FIG. 17.
FIG. 22 is a view similar to FIG. 19 showing a tracer pin resiliently mounted in the housing for tracing the gothic arch.

As will be seen in FIG. 18, the cross-sectional shape of the carver member is preferably such that the main blade 38 is formed at an angle having an apexial shape of approximately 60 degrees or less to provide an elongate linear projecting cutting edge extending upwardly above the base member. The lateral clearing or relief blades 39 are shaped similarly to the main blade, but have cutting edges of approximately 90 degrees and such edges are spaced approximately 2 millimeters short of the height of the main cutter blade from the base of the carver. The lateral spacing dimensions are approximately 3 to 6 millimeters to each side of the central or main blade. The main blade and the auxiliary relief blades are preferably serrated, as at 40 and 41, respectively, though it need not be. The serrations are believed to expedite the carving action of the blade and to form a smoother trench or pattern of the occlusal plane carved out by the blade. They are also believed to reduce the chance of excessive removal of the granular material from the chew-in mnemonic platens or mounts.

While a preferred form of blade is illustrated in FIGS. 17 and 18, other forms of mnemonic carvers may be used. Several other carver members are illustrated in FIGS. 24 through 27, wherein various forms of carver blades are shown projecting upwardly from the longitudinal central portion of the elongate carver base. These forms will be more fully described hereinafter.

The mnemonic carver members 35 are disposed with the main blade edge 38 of the carver member following the central line from the retromolar pad 34 to the cuspid area on each of the lower ridges of alveolar processes 32 of the lower model on a pad or body of wax compound 45 built up on each such ridge of the lower base plate. The lower lip line mark, if it has not been indicated by the dentist, is then determined and marked on the model, and the anterior edge of the main carver blade of the mnemonic carver is positioned to coincide with such established height of the lower lip line. The height of the carving edge of the main carver blade 38 of the mnemonic carver 35 is determined by the markings of the upper lip line 17 as established by the dentist in the mouth, and by a planar template 48 disposed on the model and supported at the selected anterior points 33 of the retromolar pads 34 and the upper end 27 of the stop or spacer member 25 secured to the anterior medial portion of the stone master model.

Figure 4:
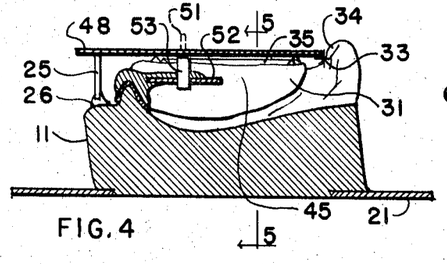
FIG. 4 is a longitudinal sectional view taken on the line 4—4 of FIG 3, showing the lower plastic "chew-in" base plate having mnemonic carvers mounted thereon and a tracer pin mounting disposed thereon, and showing the planar template positioning the upper carving edge of the carvers.
Figure 5:
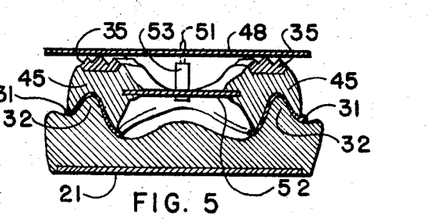
FIG. 5 is a cross-sectional view taken on the line 5—5 of FIG. 4, showing the manner in which the carvers engage the template and the tracer pin is mounted on the lower chew-in base plate.

The mnemonic carvers 35 are positioned on the compound or wax pads 45 of the lower base plate in such a manner that the central line of the main blade 38 of each carver is slightly lingual to the ridge adjacent the retromolar pads while the anterior portions of the blades are slightly buccal to the ridge in the cuspid areas. The main carver blade projects further upwardly than the lateral auxiliary or relief blades which clear off the lateral portions of the pattern, as will be seen in FIGS. 4 and 5. The lateral relief blades 39 are approximately 2 millimeters lower in height than the main blade when in place.

Figure 6:
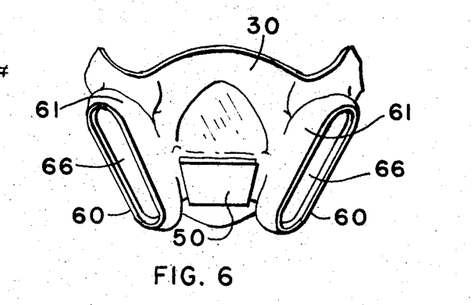
FIG. 6 is a perspective view from below and distally of the upper chew-in base plate showing the disposition of wax retainers for the mnemonic platen composition and a gothic arch tracer plate secured in place on the palatal portion of said upper base plate.

The upper chew-in base plate 30 is then removed from the articulator and a tracer platform or plate 50 having depending peripheral flanges 80 with serrated edges 81 is secured in the anterior roof or palate portion of such upper base plate with its flanges imbedded in a pad of compound or wax adhered to such palatal portion. The wax pad is used to position the tracer plate or platform on the upper base plate in a plane substantially parallel to the plane of the mnemonic carver blades 35, also to the plane of the flate template 48 supported by the retromolar pads and spacer member on the lower model, and in the position in which a suitable gothic arch tracing of the centric relation position may be made by a tracer pin 51 secured to the lower base plate.

Figures 19, 20, 21:
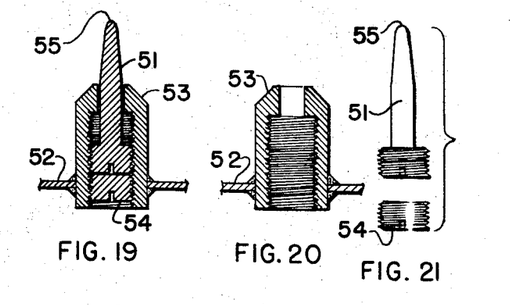
FIG. 19 is a fragmentary vertical sectional view of the tracer pin and mounting showing the tracer pin and lock screw positioned in the housing.
FIG. 20 is a vertical sectional view of the tracer pin housing and base.
FIG. 21 is an exploded view showing the tracer pin and the locking screw used in combination with the housing of FIG. 20.

The tracer pin mount or base 52 is fixed by wax or compound to the median anterior lingual portion of the lower chew-in base plate 31 at a point at which the point of the tracer pin (51 carried in a housing 53 supported by the mount or base 52) will be disposed in a more or less balanced position to properly engage the tracer plate or platform 50 mounted on the upper base plate 30. The tracer pin mount is preferably a small flat plate which may be readily waxed or otherwise secured to the lower base plate. The tracer pin 51 is threaded (see FIG. 19) into the housing and the rounded tracer point 55 is moved to a position in which it will engage the tracer plate or platform 50 when the upper and lower base plates are in proper vertical spaced relationship as determined by the dentist. The pin 51 is then locked in this position by a lock screw 54 and sticky wax, so that it cannot change its vertical position during use.

The lower chew-in base plate 31 is now ready for wax-up, and suitable wax trim is applied to said lower base plate to provide a smooth surface surrounding the mnemonic carver. Irregular notches are formed in the labial and buccal sides of the wax-up of the lower plate for later use in fixation of the upper and lower plates by means of plaster locks, as will be hereinafter more fully set forth.

Wax enclosure rings or dams 60 are then formed on the right and left sides of the upper chew-in base plate overlying the alveolar ridges for retaining a "chew-in" platen or pattern mount. The size of the enclosure rings and the position of the rings on the upper chew-in base plate 30 may be more accuartely determined by forming the rings around the mnemonic carver blades 35 on the lower base plate and leaving suitable clearance or space to the sides and ends thereof, at least about 2 millimeters on all sides. The wax may then be warmed or heated and a direct transfer made from the lower base plate to the upper base plate by moving the upper base plate downwardly to engage the upper softened edges of the wax rings. Of course, the rings may be formed directly on a built-up body of wax 61 on the upper base plate, if desired.

Figure 7:
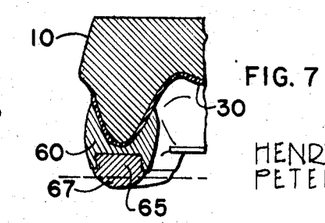
FIG. 7 is a fragmentary cross-sectional view through the left alveolar section or ridge of the upper base plate and stone model showing the manner in which the mnemonic platen composition is disposed within the plastic retainer walls and built up prior to forming the lower surface thereof into a plane for matching with the mnemonic carvers on the lower chew-in base plate.
Figure 8:
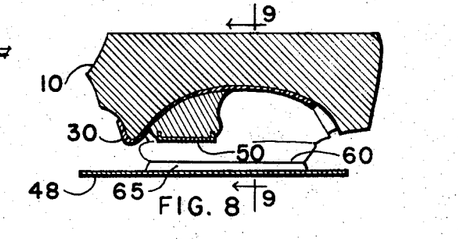
FIG. 8 is a longitudinal sectional view through the upper stone model having the plastic upper chew-in base plate disposed thereon and showing the manner in which the mnemonic platen composition is formed into a substantially planar shape by the template to conform to and co-act with the mnemonic carvers of the lower base plate.
Figure 9:
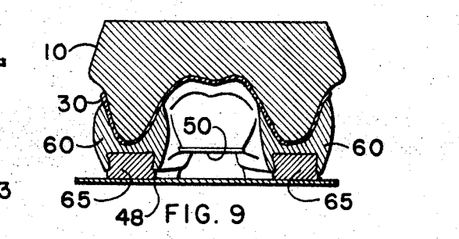
FIG. 9 is a transverse vertical sectional view taken on the line 9—9 of FIG 8, showing the manner in which the mnemonic platen composition or pattern mounts are shaped by the planar template.
Figure 10:
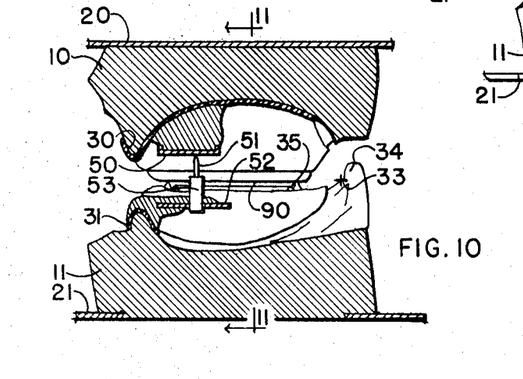
FIG. 10 is a longitudinal vertical sectional view through the upper and lower stone models having the upper and lower chew-in base plates mounted thereon and showing the carver engaging the planar lower surface of the mnemonic platen preparatory to carving the plane of occlusion and showing the upper end of the tracer pin spaced from the tracer plate.

The chew-in compound 65 or mixture for the platen or pattern body, or mount, is then prepared and disposed in the space 66 within the wax enclosures 60 and permitted to take a preliminary set. The mixture is over built in the enclosures vertically about 4 to 6 millimeters, as shown at 67 in FIG. 7, so that the lower mnemonic carver blades can reduce the chew-in platens or pattern mixture to the proper vertical height in the mouth, as will be determined by the touching or engagement of the point of the tracer pin with the exposed surface of the tracer plate or platform 50 on the upper base plate. The interior lingual portions of the platen enclosures 60 must be spaced sufficently from the moving tracer pin and the tracer plate so that the tracer pin can move freely between the enclosures when making the gothic arch tracing without hindrance.

The upper chew-in model is then ready for wax-up, and suitable waxing is applied and irregular notches on the label and buccal sides of the upper wax rim are provided for later fixation of the upper and lower models by means of plaster locks.

The chew-in mixture or composition 65 preferably consists of plaster of paris and a granular material, preferably "Crystolon" No. 150B, which is a fine abrasive grain silicon carbide material. The plaster of paris and the granular material is mixed in approximately equal parts by weight of each, with water. A quicker cutting consistency would consist of slightly greater amount of the granular material and lesser amount of plaster of paris; whereas, a harder and slower cutting material would consist of a larger amount of plaster of paris and a smaller amount of the granular material. If desired, the mixture may be flavored with mint or other suitable flavors to make the cuttings more palatable to the patient in use.

The tracer platform or plate 50 on the upper chew-in base plate is then inked or coated with a suitable and customary tracing ink which will be scraped off the plate by the point 55 of the tracer pin as the same moves over the exposed surface of the plate to inscribe the gothic arch or apex of tracing for determining the centric relation point.

The dentist now seats the upper chew-in base plate in the patient's mouth, then the lower chew-in base plate with the mnemonic carver blades thereon is fitted into the patient's mouth. Before inserting the upper base plate the mnemonic platen composition 65 in the enclosure 60 is immersed in water for a few seconds to slightly moisten the composition, since moisture facilitates the wearing down of the mixture in the platens or pattern mounts of the upper chew-in base plate.

With the upper and lower base plates positioned in the patient's mouth, the patient is instructed to close the jaws slowly together until he feels the lower mnemonic carver blades contacting the platen mounts or pattern composition of the upper base plate. He is then directed to swing his lower jaw from one side to the other, trying to "polish off" the platens and thus reduce them in height. The lateral excursions are carried out to the full lateral extent of the patient's condylar and muscular mechanism for about 30 seconds. The patient is then permitted to stop and relax, and is then directed to move the mandible from a relaxed position into a posterior-anterior or retrusive-protrusive movement, as far forward and back as possible, for about another 30 seconds. Uusually some 15 or 20 movements may be effected during such period of time. The patient is instructed not to "bite down" but merely to move the jaws to wear or polish the platens. Several times in between the movements, lateral and anterior-posterior, the lower base plate is removed from the patient's mouth and the cuttings flushed from the mnemonic carving blades as by rinsing under a faucet or similar means. The patient may also rinse out his mouth, keeping the upper base plate in the mouth while the lower is removed.

After a short period of time, the tracer pin mounted on the lower base plate will touch or engage the inked surface of the tracer plate or platform mounted on the upper base plate, and it is possible to ascertain the time at which the engagement occurs by carefully observing the inked tracer plate to determine when a tracing is first noted on such tracer plate. At this point, it is desirable to remove both the upper and lower base plates for examination, to permit the patient to rinse out his mouth, and to examine the trench that has been carved out in the platen composition by the mnemonic carver blades of the lower base plate. It may be desirable also that the dentist then cut or carve away the outer marginal portions of the platens adjacent the trench to attain completely free movement of the main or central blade of the mnemonic carver over the mixture of the platens on the upper base plate. Care must be taken not to remove any of the trench portion carved by the mnemonic carver blade. The serrations formed in the edges of the main or middle blade of the mnemonic carvers will identify that portion of the trench carved by that blade, and permit ready identification of the template or occlusal path portion of the trench.

After the upper and lower base plates have been examined and cleaned, they are reseated in the mouth of the patient and the patient is then directed to make several anterior-posterior movements, about 6 or 8 at a time, then to stop and to relax. Following such anterior-posterior movement, the patient is directed to swing the lower jaw from a central resting position to one side and then return to the central resting position. After movement to the one side some 6 or 8 times, the patient is directed to move the jaw toward the other side for about 6 or 8 times. In this manner, the patient will perform three distinctive movements, anterior-posterior, toward one side, toward the other side. These three movements should be repeated in order about five times, or until the tracing formed on the tracer plate 50 of the upper chew-in base plate shows a clearly defined arch 70 having a sharp triangular point or apex at the posterior end of the tracing. The tracing must show a sharp point at the posterior end of the drawing, since this point is the centric relation or restful position for the patient.

Figure 14:
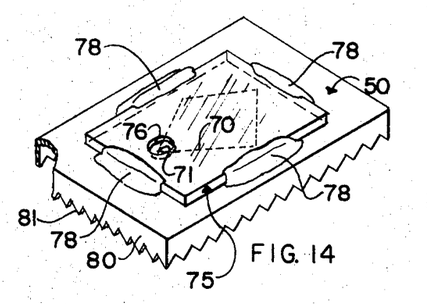
FIG. 14 is an enlarged isometric view of the tracer plate showing the control member or piece waxed or otherwise suitable fixed to the tracer surface of the tracer plate with the centric point of the tracing disposed beneath the aperture in the control member which receives the point of the tracer pin at the time the two models are plaster-locked together as shown in FIG. 13.

When the dentist is satisfied that the drawing has produced a clearly defined posterior apex, the upper base plate is removed from the mouth of the patient and a control member or piece 75 made of metal or clear plastic and having a small hole or aperture therein is placed on the tracer plate 50 in such a manner that the aperture or hole lies directly over the posterior point 71 or triangular apex of the gothic arch tracing 70. The control piece 75 may be secured to the tracer plate by wax as at 78 or other suitable adhesive, or may be secured by a screw or bolt and nut, in the usual manner, if desired.

Figure 13:
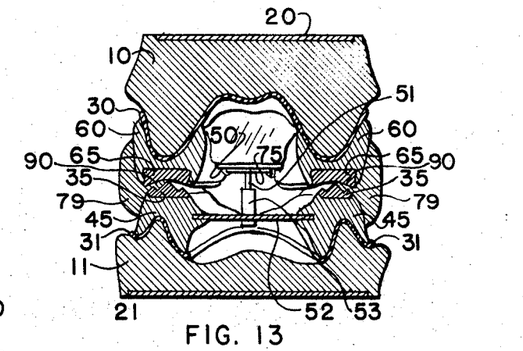
FIG. 13 is a view similar to FIG. 11 showing the upper and lower chew-in base plates plaster-locked together with the tracer pin engaged in the hole in the control member secured to the tracer plate marking the centric position of the base plates.

The upper base plate is then reseated in the patient's mouth and the patient is instructed to move his jaw back as far as possible, and slowly close the jaws together. At this point, the point 55 of the tracer pin 51 mounted on the lower base plate will engage in the small hole 76 provided in the control piece 75 and will thereby lock the upper and lower chew-in base plates in centric relation position as shown in FIG. 13.

The upper and lower base plates are then plaster-locked as at 79 in this fixed position while the patient holds his jaw in such centric position, and a thin mix of fast setting plaster is flowed without pressure between the cheek and both the base members on both of the buccal sides and is allowed to set. The notches previously provided in the wax in the upper and lower buccals of the base plates serve to keep the base plates from separating, and serve as a guide in reassembling in case of separation.

After the plaster has set, the plaster-locked base plates are removed from the mouth of the patient and the dentist can then observe and be certain that point 55 of the tracer pin 51 is disposed in the hole 76 in the control piece 75 above the centric point 71 of the gothic arch tracing 70, before mounting the assembly on the articulator preparatory to manufacture of a wax try-in model, complete with all teeth.

At this time the upper master stone model is remounted in the articulator A and the plaster-locked upper and lower base plates are seated between the upper stone model and the mounted lower model. The articulator is then disposed in the proper spaced position for the preparation of the wax try-in denture.

The teeth may be mounted on the wax bite rims of the preliminary wax rim models 12 and 13 first used, if desired. Otherwise, suitable wax rims 84 may be formed on new try-in base plates 86. The upper and lower anterior teeth are set up in the wax rims 84 according to all esthetic requirements in the usual manner, and to conform to the markings and carvings indicated by the dentist on the wax bite rims. The anterior teeth 85 should be so set that there is no overbite in a vertical direction, but there can be as much horizontal overjet as the case may require for esthetic and functional purposes.

Figure 15:
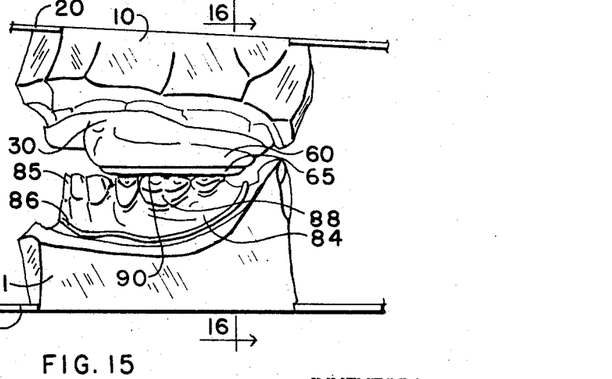
FIG. 15 is a side elevation of the upper chew-in base plate having the mnemonic carved patterns formed in the mnemonic platens adapted to the upper stone model on the upper arm of the articulator, and the lower plastic base plate having wax rims with the posterior teeth positioned thereon and fitted to the pattern of the path or plane of occlusion carved on the upper platen.

After the six anterior teeth on upper and lower wax rims are in position, the upper base plate having the wax rim with the anterior teeth mounted thereon is removed, and the upper chew-in base plate 30 having the chew-in platens with the carved patterns or template 90 formed thereon is then secured to the upper arm 20 of the articulator. At this point the lower posterior teeth 88 are set in the wax rim 84 of the lower model, positioned with their cusps set flush against the carved out chew-in template, which will be following the line of the previously established ridge along with the mnemonic carver blade was positioned.

Figures 12, 16:
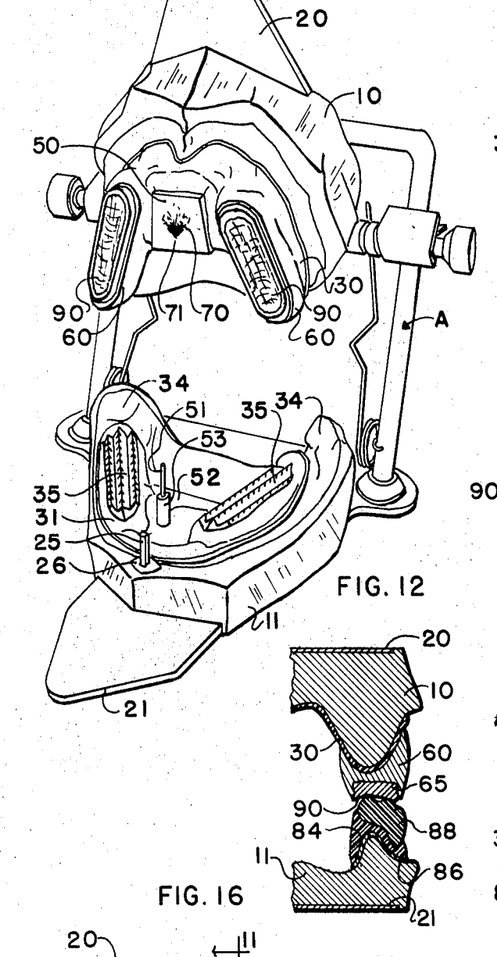
FIG. 12 is a perspective view showing the upper and lower chew-in base plates mounted on the stone models showing the relationship between the carvers and the platens and the tracer pin and the tracer plate, and illustrating the arch traced on the plate and the path of occlusion carved in the platens.
FIG. 16 is a vertical sectional view of one side of the set-up shown in FIG. 15, further showing the manner in which the posterior teeth are fitted to the carved plane of occlusion in the mnemonic platen.

The setting of the lower posterior teeth against the carved out template trench or pattern 90 produced in the platen mixture by the mnemonic carver 35 constitutes the key to the technique of establishing the patient's own normal occlusal plane. Care must be taken that the whole occlusal surfaces of the teeth are set flush against the carved out trench, thus clearly and positively establishing the patient's individual occlusal plane which is harmonious with the patient's chewing mechanism.

After all the lower posterior teeth are set in correct occlusion to the carved out pattern or template along the ridge, the upper base plate 30 with the chew-in platen mounts or templates 60 thereon is removed, and the wax rim upper base plate 12 or 86 with the previously set up anterior teeth thereon is repositioned on the upper arm of the articulator. At this point, all of the upper posterior teeth are set in place along the wax rim against the lowers in proper alignment and occlusion, in the usual manner. When the teeth have all been so disposed in the wax rims of the try-in base plates, the try-in base plates are in condition for fitting in the patient's mouth. Any changes in the positioning of the teeth for esthetic reasons may be done very easily by shifting the upper anteriors or upper posteriors. In no event can the lower posterior teeth be moved, since they determine and have established the occlusal plane of the patient as carved in the mixture forming the platen pattern or template carved out by the mnemonic carver.

After the wax try-in model has been approved by the dentist and the patient, the processing of the dentures is completed in the usual manner.

After completion of processing to provide the bases and supports for the teeth on the denture, usually plastic, the mounted dentures are again remounted or affixed on the articulator mounting bases provided by the stone models, and are preferably fastened thereto with wax for spot grinding to eliminate any changes in occlusion caused by processing of the base materials. Interferences of the upper buccal cusps, and all bilateral excursions are reduced by grinding. However, the occlusal surfaces of all the lower posteriors are not touched by grinding, neither on the articulator nor in the mouth. Any grinding of the lower posterior teeth to correct any slight changes in occlusion caused by the processing of the final base material, must be performed to fit such lower posterior teeth to the template 90 formed in the chew-in mixture 65 of the platens or mounts on the upper chew-in base plate 30. If adjustments are needed in the mouth, only the upper posteriors should be ground. The lower anteriors may be ground at the incisals so that in protrusive movements no interference results against the upper anteriors, thus preserving the upper lip line established by the dentist.

Figure 11:
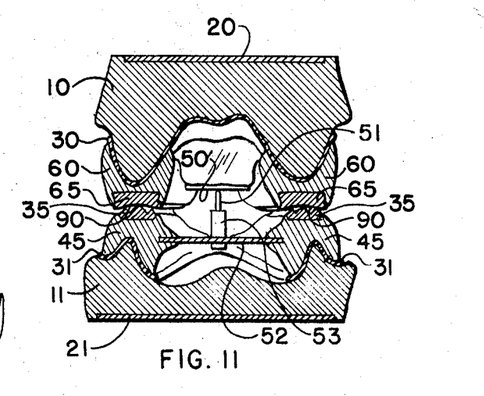
FIG. 11 is a transverse vertical sectional view taken on the line 11—11 of FIG 10, showing the tracing or pattern formed in the mnemonic platen by the carvers and showing the tracer pin engaged with the tracer plate.
Figure 23:
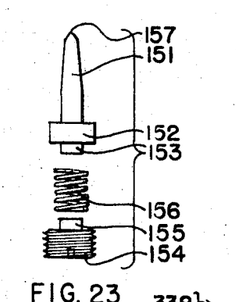
FIG. 23 is an exploded view of the tracer pin, spring and retaining screw of the resiliently mounted tracer pin structure of FIG. 22.

It may be preferable that, after the tracer pin 51 has engaged the tracer plate 50 as shown in FIG. 11, the final marking of the gothic arch tracing to establish the centric relation should be accomplished by means of a resiliently mounted tracer pin so that only slight pressure will be needed to effect the marking of the tracing and so that the chew-in base plates will not be depressed or moved in the mouth during such marking. Such a resilient tracer pin is shown in FIGS. 22 and 23 wherein the tracer pin 151 is provided with an external annular flange 152 at its lower portion and depending boss 153 at its lower end. A retaining screw 154 is threaded in the housing 53 previously used, and the screw has an upstanding axial boss 155 on its upper end engageable within the lower open end of a helical spring 156 as clearly shown in FIG. 22 so that the spring is not displaced laterally during movements of the pin and spring in the threaded bore of the housing. The bosses 153 on the pin and 155 on the retaining screw are so designed that when in position in the housing a space of approximately 2 millimeters is provided for vertical movement of the pin when the point 157 thereof is in engagement with the tracer plate. The diameter of the flange 152 of the tracer pin is such that it is guided slidably vertically in the threaded bore of the housing and, along with the body portion of the tracer pin extending through the aperture at the upper end of the bore of the housing, is supported against lateral displacement and provides a fine and accurate tracing.

Figures 24, 25, 26, 27, 28, 29, 30, 31:
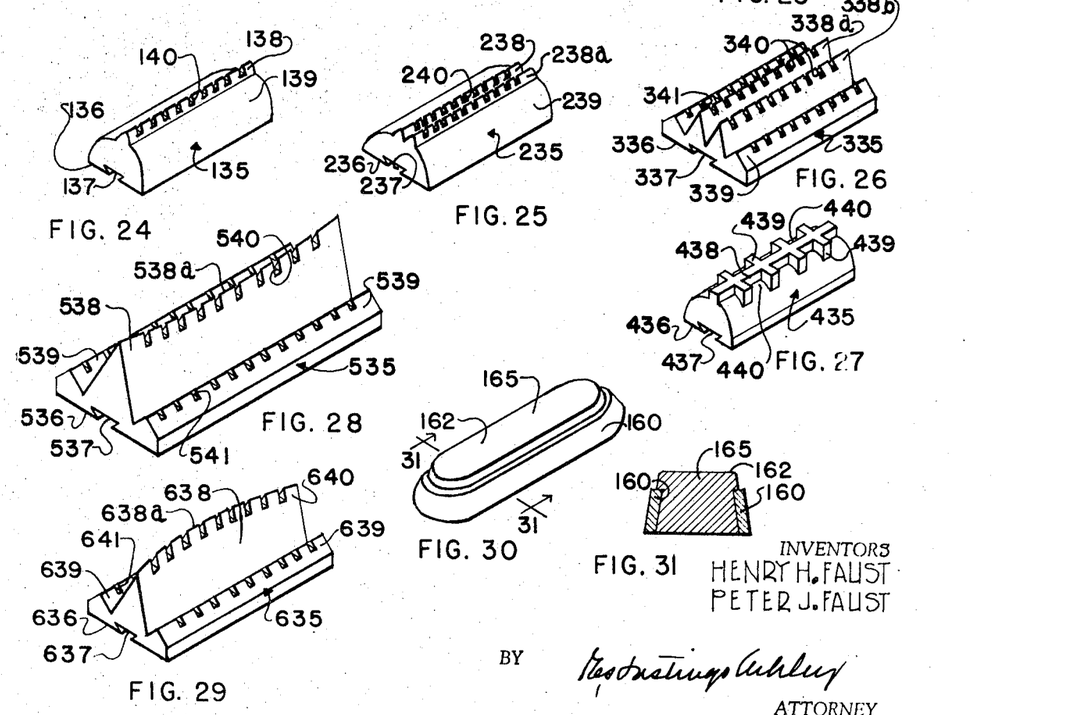
FIG. 24 is a perspective view of a modified form of mnemonic carver having a single carving blade.
FIG. 25 is a perspective view of a modified carver having two parallel carving blades.
FIG. 26 is a view of the modified form of mnemonic carver, of the type shown in FIG. 17, having two carving blades.
FIG. 27 is a further modified of mnemonic carver provided with blades for carving a pattern as a result of anterior-posterior movement.
FIG. 28 is an enlarged and vertically exaggerated mnemonic carver having a concave curve of Spee cutting blade.
FIG. 29 is a carver having a convex central carver blade adapted for use on the upper or maxilla chew-in base plate.
FIG. 30 is a modified form of mnemonic platen structure adapted incorporation onto the base plates for use with the carvers.
FIG. 31 is an enlarged transverse vertical section view taken on the line 31—31 of FIG. 30.

It is also believed readily apparent that under certain conditions, as has already been pointed out, various modifications of the mnemonic carver blades may be desired to obtain particular results. A carver 135 having a single cutting blade 138 thereon is shown in FIG. 24. The body of the carver has substantially a longitudinal convex upper surface 139 and is provided with a longitudinal central undercut groove 137 in its lower surface 136 for reception of the wax or compound by means of which the carver blade is secured to the base plate. The blade 138 is preferably provided with serrations 140 in its upper cutting edge.

A further modified form of carver 235 is shown in FIG. 25 having two main carving blades 238a and 238b formed on the upper convex surface 239 of the blade. This carver also has the retaining groove 237 formed in its lower surface 236 and in all respects other than the provision of two carving blades on the upper surfaces substantially identical to that of FIG. 24. The two carving blades are provided with serrations 240 to facilitate removal of the platen mixture 65, as has been previously described.

In FIG. 26, a further modified form of carver 335, closely resembling that of the carver 35, is illustrated. This carver is provided with two longitudinally extending acute angular cutting blades 338a and 338b. The auxiliary blades 339 are provided on each side of the main carver blades and each of the main carver blades is provided with serrations 340, and the side or auxiliary carver blades are provided with serrations 341. Instead of having the vertical apertures 37, a dovetailed longitudinal groove 337 is formed in the lower surface 336 of the carver and extends longitudinally thereof for receiving the wax. Of course, if desired, apertures similar to the apertures 37 of the carver 35 shown in FIGS. 17 and 18 may be provided in this carver as well as in all other carvers illustrated and described herein.

FIG. 27 illustrates a further modified carver 435 which is designed for use where the lateral movement of the mandible is limited. In this form of the carver the cutting blade 438 is formed with a plurality of laterally extending cutting wings or flanges 439 which extend outwardly from each side of the longitudinally extending main carver blade 438 and provide a substantially planar lateral carving surface with openings 440 provided between the lateral wings to permit the lateral wings to carve during anterior-posterior movement of the carver with respect to the platen mixture. This carver is also provided with an undercut or dovetailed longitudinally extending groove 437 in its lower surface 436 for retaining the carver in place, though vertical apertures 37 such as those of the carver FIGS. 17 and 18 may be provided, if desired.

In FIG. 28 a modified form of carver 535 is illustrated which is provided with a concave curved upper cutting edge 538a. This corresponds substantially to the curve of Spee commonly used in setting the posterior teeth in dentures. The height of the carver blade 538 is exaggerated somewhat in the illustration to more clearly show the curvature formed in the cutting edge 38 thereof. Lateral or auxiliary cutting blades 539 are formed to each side of the main carver blade, and serrations 540 are formed in the main carver blade while serrations 541 are formed in the auxiliary cutter blades. This form of the carver is also illustrated with a longitudinally extended undercut or dovetailed groove 537 formed in the lower surface 536 thereof for retaining the carver in place on the base plate, though apertures may also be provided in this carver as well.

FIG. 29 shows a further modification of carver 635 in which the carver blade 638 is formed with a convex cutting edge 638a, which is likewise exaggerated in height for the purpose of illustration of the curvature formed therein. This carver is likewise provided with auxiliary blades 639 to each side of the main carver blade, and serrations 640 are formed in the main carver blade and 641 formed in the auxiliary cutting blades. The longitudinal retaining undercut or dovetailed retaining groove 637 is formed in the lower surface 636 of this blade, though apertures extending through the blade may be provided in this carver as well. This form of carver is particularly adapted for mounting on the upper chew-in base plate for carving the plane of occlusion, having a curve of Spee, in the mixture of platens secured to the lower chew-in base plate. In such instances, the positions of the platens and the carvers are reversed but other parts of the technique are followed, and the posterior teeth are set to the plane carved on the platens on the lower base plate of the chew-in models.

It is believed readily apparent that where multiple cutting blades are formed on the carver body, as in FIGS. 25 and 26, the portions of the cutting edges between the serrations form, in effect, a plurality of spaced projecting cutting members which carve out the plane of occlusion. It is further apparent that diamond crystals or points, or carbide points, may be positioned along the crest of a domed carver such as is shown in FIGS. 24 and 25, to replace the cutter blades thereon for carving the path of occlusion. Obviously, also, auxiliary cutting blades similar to the blades 39 or 339 may be formed along the sides of such domed carver.

Obviously, other variations of the carvers may be provided, if desired.

It is thus readily apparent that any of the carvers of FIGS. 17, 18, or 24 through 29 may be used satisfactorily in carrying out the process and technique hereinbefore described, depending upon the needs of the particular patient for whom the dentures are being prepared, and the choice of carver used by the dentist treating the patient.

It is also believed readily apparent that the mnemonic tracer platens or templates 60 may be pre-prepared as illustrated in FIGS. 30 and 31. As clearly shown in these figures, a wax ring 160 which is formed in an elongate oval shape to the desired length and provided with undercut or sloping inner walls 161 as shown in FIG. 31, is filled with the grinding mixture or mnemonic platen mixture 165 prepared in the same manner as the platen mixture of the fore first described and pressed in place in the wax ring to provide a flat surface 162 on the upper exposed surface of the mixture. The wax ring 160 may be readily incorporated in the wax or compound deposited on the plastic base plates 31 of the chew-in models without the necessity for carrying out those steps of the procedure previously outlined. The position of the upper surface 162 of the platen would be determined by the position of the planar template 48 in the same manner as the lower surface of the mixture 65 was determined in the technique first described. Thus, the platens or templates or pattern mounts 160 may be pre-formed and packaged with mnemonic carvers of corresponding length to be delivered to the dentist or the dental laboratory for use in carrying out the techniques previously outlined without the need for preparation of the platen mixture. This would effect a saving of time in the preparation of the chew-in models.

It is also believed readily apparent that, if desired, plastic rings 160 may be packaged with containers of loose unmixed binder or plaster of paris and granular material, together with the desired mnemonic carvers, for use by the dentist or dental laboratory. In such event the carvers and the wax rings 160 would be matched in length and would be separately enclosed in suitable plastic containers incorporated in a packaged unit. Also, it is believed obvious that the tracer plate 50 and the control piece 75, as well as the tracer pins 51 and 151 and mount or support 52 and 53, may likewise be incorporated as a part of the package, if desired.

From the foregoing, it is readily apparent that a new and unique means and method of making full denture constructions, providing a natural and accurate functional plane of occlusion corresponding to the patient's own chewing mechanism has been provided. It will also be apparent that the method and the apparatus is adapted for use in determining and setting teeth to the proper functional natural plane of occlusion of the patient, not only in full dentures but in partial dentures involving full posterior replacements.

It is also readily apparent that the method outlined expedites the location of a natural, comfortable, accurate plate of occlusion for the dentures corresponding to the chewing mechanism of the patient for whom the dentures are being constructed.

It is also readily particularly apparent that the determination of the occlusal plane and centric relation of the dentures of the particular patient is obtained by means of the patient's own chewing mechanism, which produces dentures having an occlusal plane conforming to and harmonious with the patient's own natural chewing operation and producing a comfortable and satisfactory set of dentures.

It is also apparent that an improved means and method of determining the normal centric position or relation of the patient's chewing mechanism has been devised and described.

Further, it is apparent that the apparatus and method lends itself to accomplishing the determination of the plane of occlusion under varying conditions of movement of the patient's muscular and structural configuration to provide an accurate carving, tracing or pattern of the patient's normal plane of occlusion.

The foregoing description of the invention is explanatory only, and changes in the details of the construction illustrated and the method and technique described may be made by those skilled in the art, within the scope of the appended claims, without departing from the spirit of the invention.

What is claimed and desired to be secured by Letters Patent is:

1. A method of making dentures including: forming upper and lower base plates; mounting cuttable platen means on one of said base plates having an exposed surface disposed in substantially the occlusal plane of the patient's chewing mechanism; mounting cutting means on the other base plate having a linear cutting edge disposed in substantially the occlusal plane of the patient's chewing mechanism and in position to engage the exposed surface of the platen means; and moving the linear cutting edge of the cutting means with respect to the exposed surface of the platen means laterally and anteriorly-posteriorly by means of the patient's chewing mechanism to carve out a path of occlusion in said exposed surface of said platen determined by the movements of the patient's chewing mechanism.

2. The method of claim 1 and the additional step of forming a tracing of the centric relation of the base plates in conformity with the patient's chewing mechanism while carving said path of occlusion in said platen means.

3. A method of making dentures including: forming upper and lower base plates; mounting an elongate body of soft cuttable pattern material on each of the alveolar ridges of one of said base plates having an exposed substantially planar surface disposed longitudinally along the alveolar ridge of the base plate in a plane predetermined by the structure of the patient's chewing mechanism; mounting an elongate linear metallic cutting means on each of the alveolar ridges of the other base plate having at least one elongate longitudinally extending cutting edge disposed longitudinally of said ridge in said plane determined by the structure of the patient's chewing mechanism and in position to engage and carve the planar exposed surface of the pattern material; moving the cutting edge of the cutting means longitudinally and laterally with respect to the exposed surface of the pattern material by means of the patient's chewing mechanism to carve out an elongate trench path of occlusion in said each body of pattern material determined by the movements of the patient's chewing mechanism; and fitting teeth on another denture base plate corresponding identically to said other base plate with their cusps set to the occlusal path carved in the pattern material on said base plate.

4. A method of making dentures as set forth in claim 1, and fitting teeth on said other denture base plate with their cusps set to the occlusal path carved in the platen means, with the base plates held in centric relation.

5. The method of claim 1, wherein said cuttable platen means is mounted on the upper base plate, and the cutting means is mounted on the lower base plate.

6. Apparatus for determining the occlusal path of a patient for setting posterior teeth of a denture including: upper and lower plastic base plate means; elongate carver means having at least one linear cutting edge means disposed longitudinally on one of said base plate means along an area corresponding substantially to each alveolar process of the patient and in a plane predetermined by the structure of the patient's chewing mechanism; means securing said carver means to said one of said base plate means; and platen means each comprising a body of soft carvable pattern material secured to the other of said plastic base plate means longitudinally along the alveolar ridges thereof in a position substantially parallel to the carver means and having an exposed wearable surface disposed to be engaged by said cutting edge means of the opposed carver means upon lateral and anterior-posterior movement of said base plate means with respect to each other by the patient's chewing mechanism to carve an elongate occlusal trench path in said pattern material.

7. Apparatus of the character set forth in claim 6 and tracer plate means mounted on the upper plastic base plate means; and tracer pin means mounted on the lower plastic base plate means and disposed to engage said tracer plate means to scribe thereon the centric relation of the upper and lower base plate means when in position in the patient's mouth by movement of the patient's chewing mechanism, and to limit movement of said base plate means toward each other to space said base plate means at the proper vertical height relation determined for the patient.

8. Apparatus of the character set forth in claim 7, wherein said tracer pin means includes a housing having a tracer pin longitudinally movable therein toward and away from said tracer plate means; and means securing said pin adjustably in projecting position to adjustably limit movement of said base plate means toward each other to provide said proper vertical height relation.

9. A carver means for carving an occlusal path in a mnemonic platen of carvable material on a denture base plate including: an elongate body, projecting elongate cutter means formed thereon and extending longitudinally of said body; and means on said body opposite said cutter means for receiving wax or the like to secure the body in position on another denture base plate for use to carve said occlusal path.

10. A carver means of the character set forth in claim 9, wherein the cutter means comprises an elongate blade having a linear cutting edge formed thereon.

11. A carver means of the character set forth in claim 10, wherein the elongate cutter blade cutting edge is serrated.

12. A carver means of the character set forth in claim 10, wherein laterally projecting planar wing cutters are provided at spaced intervals on each side along the longitudinal cutter blade.

13. A carver means of the character set forth in claim 10, wherein the elongate linear cutting edge of the blade is arcuate.

14. A carver of the character set forth in claim 10, wherein the elongate linear cutting edge of the blade is convex.

15. A carver of the character set forth in claim 10, wherein the elongate linear cutting edge of the blade is concave.

16. A carver means of the character set forth in claim 9, wherein the cutter means comprises a plurality of projecting elongate longitudinally parallel linear cutting blades.

17. A mnemonic platen of carvable material adapted to be mounted on a denture base plate to be shaped to determine an occlusal path by carving by an elongate metallic cutting blade mounted on an opposed denture base plate and including: a retaining ring; and a relatively soft wearable mixture confined within said ring and comprising a binder and a fine granular material.

18. A platen of the character set forth in claim 17, wherein the binder comprises plaster of paris.

19. A platen of the character set forth in claim 17, wherein the granular material comprises a fine grain silicon carbide.

20. A platen of the character described in claim 17, wherein the ring is filled with the mixture and a planar carving surface is formed on one exposed surface of the mixture, whereby the opposite surface of said platen may be incorporated onto said denture base plate for use in carving the path of occlusion in said exposed carving surface of said mixture.

21. The method of claim 1 and the additional step of limiting the carving of the exposed surface of the platen means by the cutting edge of the cutting means at the proper vertical height relationship between the upper and lower base plates.

22. A method of fabricating an oral prosthesis including: forming upper and lower base plates; mounting metal linear carvers bilaterally along the posterior ridges on one of said base plates; mounting an elongate body of soft carvable material in apposition to said carvers along the posterior ridges of the opposite base plate; mounting the base plates in a patient's mouth and moving said base plates relating to each other by moving the patient's mandible to carve an elongate trench path of the occlusal by means of said linear carvers in said bodies of carvable metal.

23. The method of claim 22 and the additional step of placement of posterior teeth with the cusps thereof disposed in engagement with the occlusal path functionally generated in the bodies of soft carvable material.

References Cited

UNITED STATES PATENTS

| 2,183,512 | 12/1939 | Brewner | 32—19 |
| 2,587,528 | 2/1952 | Robinson | 32—19 |
| 2,674,798 | 4/1954 | Craigo | 32—19 |
| 2,696,668 | 12/1954 | Fox | 32—19 |
| 2,746,150 | 5/1956 | Needles | 32—19 |
| 2,876,541 | 3/1959 | Jensen | 32—19 |
| 3,068,570 | 12/1962 | Thompson et al. | 32—19 |

ROBERT PESHOCK, Primary Examiner

U.S. Cl. X.R.

32—19